(12) United States Patent
Galletta, Jr.

(10) Patent No.: US 11,292,568 B2
(45) Date of Patent: *Apr. 5, 2022

(54) OUTBOARD MOTOR AND METHODS OF USE THEREOF

(71) Applicant: Robby Galletta Enterprises LLC, Savannah, GA (US)

(72) Inventor: Robert J. Galletta, Jr., Savannah, GA (US)

(73) Assignee: Robby Galletta Enterprises LLC, Savannah, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/378,879

(22) Filed: Jul. 19, 2021

(65) Prior Publication Data
US 2021/0339839 A1 Nov. 4, 2021

Related U.S. Application Data

(63) Continuation of application No. 16/550,890, filed on Aug. 26, 2019, now Pat. No. 11,068,297, which is a
(Continued)

(51) Int. Cl.
*B63H 20/12* (2006.01)
*B63H 20/14* (2006.01)
(Continued)

(52) U.S. Cl.
CPC ............ *B63H 20/14* (2013.01); *B63H 20/106* (2013.01); *B63H 20/12* (2013.01); *B63H 20/32* (2013.01);
(Continued)

(58) Field of Classification Search
CPC ........ B63H 20/12; B63H 20/14; B63H 20/32; B63H 20/106; G06F 9/45558;
(Continued)

(56) References Cited

U.S. PATENT DOCUMENTS

| 1,161,935 A | 11/1915 | Heck et al. |
| 3,376,842 A | 4/1968 | Wynne |

(Continued)

FOREIGN PATENT DOCUMENTS

| CN | 101475050 A | 7/2009 |
| JP | 63-194095 A | 8/1988 |

(Continued)

*Primary Examiner* — Lars A Olson
(74) *Attorney, Agent, or Firm* — Mathew L. Grell; Grell & Watson Patent Attorneys LLC

(57) ABSTRACT

An outboard motor and methods of use thereof in general, includes a powerhead removeably affixed to the transom of a boat, and a gear case rotationally connected to a propeller shaft, the outboard motor including a telescopic drive shaft, the telescopic drive shaft having a first drive shaft section rotationally connected to the motor and a second drive shaft section rotationally connected to the gear case, and a telescopic drive shaft housing, the telescopic drive shaft housing configured to support the telescopic drive shaft internally therethrough, whereby the telescopic drive shaft and the telescopic drive shaft housing are configured to provide depth adjustment for the gear case and the propeller shaft, and thus enable the propeller to be raised and lowered during propulsion to improve propulsion efficiency.

20 Claims, 10 Drawing Sheets

Related U.S. Application Data continuation of application No. 15/885,785, filed on Jan. 31, 2018, now Pat. No. 10,392,091, which is a continuation of application No. 15/188,330, filed on Jun. 21, 2016, now Pat. No. 9,896,175.

(51) Int. Cl.
| | | |
|---|---|---|
| *B63H 20/32* | (2006.01) | |
| *B63H 20/10* | (2006.01) | |
| *G06F 3/06* | (2006.01) | |
| *G06F 9/455* | (2018.01) | |

(52) U.S. Cl.
CPC ............ *G06F 3/0604* (2013.01); *G06F 3/064* (2013.01); *G06F 3/065* (2013.01); *G06F 3/067* (2013.01); *G06F 3/0664* (2013.01); *G06F 9/45558* (2013.01); *B63H 2020/145* (2013.01); *B63H 2020/323* (2013.01); *G06F 2009/4557* (2013.01); *G06F 2009/45562* (2013.01); *G06F 2009/45595* (2013.01)

(58) Field of Classification Search
CPC ...... G06F 3/0604; G06F 3/065; G06F 3/0664; G06F 3/064; G06F 3/067; G06F 2009/4557; G06F 2009/45562; G06F 2009/455953; G06F 9/0604; G06F 9/065; G06F 9/0664; G06F 9/064

USPC ........... 440/52, 53, 58, 62, 63, 75, 81; 718/1
See application file for complete search history.

(56) References Cited

U.S. PATENT DOCUMENTS

| | | | |
|---|---|---|---|
| 5,112,256 A | | 5/1992 | Clement |
| 5,112,259 A | | 5/1992 | McElroy |
| 5,465,633 A | | 11/1995 | Bernloehr |
| 5,711,742 A | | 1/1998 | Leinonen |
| 7,163,427 B1 | | 1/2007 | Lee |
| 7,662,005 B2 | * | 2/2010 | Provost .................. B63H 20/12 440/53 |
| 9,896,175 B2 | * | 2/2018 | Galletta, Jr. ........... B63H 20/14 |
| 10,392,091 B2 | * | 8/2019 | Galletta, Jr. ........... B63H 20/14 |
| 11,068,297 B2 | * | 7/2021 | Galletta, Jr. ........... B63H 20/14 |
| 2013/0045648 A1 | | 2/2013 | Kinpara et al. |

FOREIGN PATENT DOCUMENTS

| | | |
|---|---|---|
| JP | 1997079486 B2 | 3/1997 |
| JP | 2011201537 A | 10/2011 |
| JP | 2013039887 A | 2/2013 |
| WO | 2007020906 A1 | 2/2007 |

\* cited by examiner

OUTBOARD MOTOR AND METHODS OF USE THEREOF

CROSS-REFERENCE TO RELATED APPLICATIONS

This application claims priority to and is a continuation of U.S. patent application Ser. No. 16/550,890 filed on Aug. 26, 2019, entitled "Outboard Motor and Methods of Use Thereof", which is a continuation of U.S. patent application Ser. No. 15/885,785, filed on Jan. 31, 2018, entitled "Outboard Motor and Methods of Use Thereof", which issued on Aug. 27, 2019 as U.S. Pat. No. 10,392,091, which is a continuation application of U.S. patent application Ser. No. 15/188,330 filed on Jun. 21, 2016, entitled "Outboard Motor and Methods of Use Thereof", which issued on Feb. 20, 2018 as U.S. Pat. No. 9,896,175, which is incorporated herein by reference in its entirety.

TECHNICAL FIELD

This disclosure relates to an outboard motor and methods of use thereof. More specifically the disclosure relates to an outboard motor with a rotating lower unit.

BACKGROUND

An outboard motor is the most common motorized method of propelling or propulsion system for small, medium, and large watercraft. The primary components of the outboard motor have not changed much since inventor Ole Evinrude introduced his two-cylinder motor—ELTO stood for Evinrude Light Twin Outboard. For example, an outboard motor is a self-contained unit that includes an engine or powerhead, a midsection containing an exhaust housing, gear box and drive shaft, and a lower unit containing a propeller, an exhaust port, and a skeg, wherein the outboard motor is designed to be affixed to the outside of the transom, which is positioned at the stern of a boat or ship. As well as providing propulsion, outboards provide steering control, as they are designed to pivot about their mountings and thus control the direction of thrust or propulsion of the boat. Outboard motors have advanced from two-stroke to four-stroke motors, from 2-, 3- and 4-cylinder models, added fuel injection, electronic timing and other efforts to increase fuel economy, low end torque, and smoother operation.

Even with advances in engine design, (these advances have been largely borrowed from other forms of motorized transportation), the modern outboard is a contradiction, having been with us for over a century it has in fact changed little, the last major advance (which in fact is now a problem) happened over fifty years ago when Carl Keikhaefer of Mercury Marine invented the through the propeller hub exhaust system that to this day allows virtually all modern outboard motors to dump untreated, un-muffled exhaust into the aquatic environment. One disadvantage of the modern outboard, especially two-stroke motors is their inefficiency in burning the oil and gas mixture causing large amounts of pollution (especially oil in the water). Moreover, all outboard motors whether two-stroke to four-stroke motors exhaust untreated pollution (in the form of gases and petroleum particulate) down their midsection and out the propeller exhaust section directly into the water polluting the water and marine life. Moreover, another disadvantage of the modern outboard, motors exhausting untreated noise pollution down their midsection and out the propeller section polluting the water with noise pollution causing marine life to depart from their habitat or flee from the boat noise or become disoriented. Only recently has the true impact of our presence under the surface of the water begun to be recognized (reference documentary Sonic Seas).

Another disadvantage of this approach is its fixed configuration wherein the powerhead, midsection and propeller are designed as a fixed rigid unit and the fixed rigid unit pivots about its mountings or articulate thereabout to control the direction of thrust or propulsion of the boat or to offer directional control of the craft. A fixed powerhead, midsection, and propeller place all the units weight and torque on the pivot pin and steering apparatus, and thus limit the size of the motor. In other words, you must turn the entire outboard motor to turn the boat. Imagine if the entire front end of an automobile needed to move right to left for steering rather than just turning the wheels.

Another disadvantage of the modern outboard and its fixed configuration positioning the transmission gear case and the exhaust manifold beneath the surface of the water, in front of the propeller, this creates tremendous drag and as speeds increase begins to literally block the water from the control surfaces and propeller blades by creating a shock wave sufficient to cause a vacuum pocket to begin to form around the submerged lower unit. As speed increases, this undesirable condition can escalate to the point that the water loses contact completely with the control surfaces and the propeller itself. This condition is referred to as "blowing out" the lower unit, and can cause complete loss of control of the craft at high speed. Also, the fully submerged, slipping type propeller generates a powerful vortex around itself due to the water being ejected radially from its center, creating a tornado of rotating water around the propeller unit. Moreover, water ejected radially does not provide thrust or control and is therefore a complete waste of energy. There is almost always a vacuum pocket in the center of the submerged propellers vortex, as a matter of fact; virtually all outboard motors count on this vortex to dump untreated exhaust into the marine habitat. However, as the speed of the rotation increase, centrifugal force will cause a vacuum cavity in the center to grow, as the rotation of the propeller approaches 2000 RPM the vacuum pocket grows until it reaches the blades of the propeller, at this point cavitation begins to occur. Cavitation is defined as pockets of vacuum reaching the propeller blades. These pockets of vacuum when in contact with the blades are an extremely undesirable situation because the propeller will make little or no thrust under these conditions, control of the craft is compromised, and the propeller blades will quickly deteriorate as the scouring action of the cavitation bubbles build up on the surface of the blades. Add to this, the fact that virtually all outboards have an exhaust manifold in this submerged gear case means that at anything above a few miles per hour, the hydrostatic drag of just pushing this assembly through the water is very, very high. Therefore, a completely submerged propeller while effective and even desirable at low speeds becomes a liability at higher speeds.

The vast majority of boats under 50 feet in length are plaining type hulls, these hulls are designed to enable the boat to step up "on top" of the water while the boat is underway, with the hull "on top" of the water, the boat is able to achieve speeds that make cruising to more remote destinations practical. Whether for work or pleasure it is always desirable to get to where you are going as quickly as possible. This is where the shortcomings of current outboard motors become glaringly evident. Modern boats are quite capable of traveling safely at speeds over 50 MPH, however, fuel efficiency degenerates incredibly quickly at speeds over 25 mph. Modern engine technology is such that fuel efficiency in the engine itself has made great strides. However, at the mentioned comparatively low speeds the current outboard motor, even with the latest technically advanced engines, dramatically loses efficiency. While some fuel efficiency is always lost as speeds increase due to well documented factors such as drag coefficient, in the case of the outboard motors the tradeoff is so profound as to be unacceptable.

As the water craft begins to move hydrostatic drag is created by the lower unit, exhaust pipe, and transmission (gear box) located below the surface, causes the even the most modern outboard motor to become dramatically inefficient, even at very low speeds. Outboards today overcome the problems intrinsic in their design by simply adding power until they overcome the drag and with that comes fuel consumption, massive fuel consumption. Larger boats searching for the performance and versatility of the outboard motor are required to employ exotic and expensive multiple engine instillations. This solution is costly and inherently inefficient as it must push two or more of the parasitic lower units through the water as well as the weight and complexity of multiple controls and support apparatus. Such outboards have a narrow and tall profile.

Another disadvantage of the modern outboard is its actual performance is limited by poor efficiency in the system that actually converts the power to thrust. Most medium to larger fishing boats cannot exceed 60 miles per hour and get less than three (3) miles to the gallon. Increases in performance come at crippling cost; usually multiple outboard engines, and fuel mileage measured is in fractions of one mile to the gallon. While it is true some smaller four stroke boats operating at 25 MPH or less can reach ten MPG, when these craft, operated are only slightly faster, and the fuel mileage deteriorates precipitously. All but a tiny fraction of standard size fishing boats average single digit fuel economy. Boats of 17 feet or better, boats with duel engines or boats that operate in excess of fifty miles per hour most often dip below one (1) MPG, making the outboard powered boat, the boats that populate the waterways by the millions, one of the most inefficient forms of transportation ever devised.

Another disadvantage of the modern outboard is it has almost exclusively one forward gear with the propeller acting as a torque converter and transmission, imagine your automobile stuck in low gear or having to start off in high, either condition results in very poor performance and fuel inefficiency. Used in this manner the propeller must be a compromise between low speed slip and high speed thrust, and the results are a unit that does neither particularly well, and boats that, when operated at speeds above twenty five 25 MPH, are very inefficient.

The current outboard motor relies on the propeller to "slip" in the water allowing it to have a "fluid coupling" action, a kind of "torque converter" effect has served to allow marine propulsion systems in general and outboard motors in particular to get along with almost no development other than in the propeller itself.

High speed drives, such as Arneson surface drives, are specialized propulsion units for water craft designed to enable the propeller blades to break the water's surface, these are called surface-piercing propellers. Surface drives do not expose the entire gear case to the water as do standard propeller drive systems with their fully submerged propellers. These drives provide profound performance and efficiency gains at higher speeds. However, these systems are primarily limited to larger craft because the great disadvantage to these surface drives is they are expensive and require the engine to be inboard (inside) the craft, therefore these superb units are only utilized with custom or specialized power boats, such as high-performance speed boats, performance yachts, and military or coast guard boats. Moreover, surface drives make low speed maneuverability, such as docking more challenging since the propeller blades lack the blade surface area contacting the water to generate large thrust at low propeller speeds found in a submerged propeller. Therefore, these instillations usually require the use of separate low speed thrusters for docking and maneuvering in close quarters such as a harbor.

Therefore, it is readily apparent that there is a need for an outboard motor and methods of use thereof that functions to enable a combination of features including the midsection and/or propeller to pivot about the powerhead, treat motor exhaust and discharge to the atmosphere eliminating water and noise poisonous water pollution discharge into the water and spread over miles, enable the propeller depth to be raised to surface-piercing and lowered to fully submerged propeller during propulsion to improve propulsion efficiency at both high and low speeds respectively, and reduce the lower unit and gear box size to reduce the source of crippling hydrostatic drag, and thus, improve the performance and fuel efficiency of the outboard motor.

BRIEF SUMMARY

Briefly described, in an example embodiment, the present disclosure overcomes the above-mentioned disadvantages and meets the recognized need for an outboard motor and methods of use thereof in general, includes a powerhead removeably affixed to the transom of a boat, and a gear case rotationally connected a propeller shaft, the outboard motor includes a combination of features: the midsection and/or lower unit (gear case, propeller shaft, and propeller) are configured to independently rotate 360 degrees about the powerhead thus removing motor weight and torque from the steering mechanism; treating exhaust via a catalytic converter and muffler before discharging to the atmosphere eliminating water and noise pollution and toxic discharge into the water, a telescopic drive shaft, the telescopic drive shaft having a first drive shaft end rotationally connected to the motor and a second drive shaft end rotationally connected to the gear case, and a telescopic drive shaft housing, the telescopic drive shaft housing configured to support the telescopic drive shaft internally therethrough, whereby the telescopic drive shaft and the telescopic drive shaft housing are configured to provide depth adjustment for the gear case and the propeller shaft to enable the propeller depth to be raised to surface-piercing and lowered to fully submerged during propulsion, and thus to improve propulsion efficiency at both high and low speeds respectively, a multi-speed transmission to enable higher speed revolutions per minute of propeller shaft and propeller, and a surface-piercing propeller that injects or dissolves large amounts of oxygen into aquatic environment because the propeller breaches the water surface verse toxic hot poisonous carbon monoxide and other petroleum by-products spread over miles.

This as opposed to current designs which, enhanced by the heat, turbulence and vacuum, intrinsic to the through the prop exhaust, design, dissolve poisonous carbon monoxide and other petroleum by-products and then spread this pollution over miles.

According to its major aspects and broadly stated, the present disclosure in its exemplary form is an outboard motor and methods of use having a motor, and a gear case rotationally connected a propeller shaft, the outboard motor includes a telescopic drive shaft, the telescopic drive shaft having a first drive shaft end rotationally connected to the motor and a second drive shaft end rotationally connected to the gear case, and a telescopic drive shaft housing, the telescopic drive shaft housing configured to support the telescopic drive shaft internally therethrough, whereby the telescopic drive shaft and the telescopic drive shaft housing are configured to provide 360 degrees of rotation independent of a motor structure supporting the motor, and thus functions to enable the midsection and/or propeller to pivot about the powerhead, treat motor exhaust and discharge to the atmosphere eliminating water and noise pollution discharge into the water, and reduce the lower unit and gear box size and raise it to the surface to reduce the source of crippling hydrostatic drag and thus improve the fuel efficiency of the outboard motor.

In an exemplary embodiment of the outboard motor and methods of use thereof includes an outboard motor having a motor, and a gear case rotationally connected a propeller shaft, the outboard motor includes a telescopic drive shaft, the telescopic drive shaft having a first drive shaft end rotationally connected to the motor and a second drive shaft end rotationally connected to the gear case, a telescopic drive shaft housing, the telescopic drive shaft housing configured to support the telescopic drive shaft internally therethrough, whereby the telescopic drive shaft and the telescopic drive shaft housing are configured to provide depth adjustment for the gear case and the propeller shaft.

In a further exemplary embodiment the outboard motor and methods of use thereof includes an outboard motor having a motor, and a gear case rotationally connected a propeller shaft, the outboard motor includes a drive shaft, the drive shaft having a first drive shaft end rotationally connected to the motor and a second drive shaft end rotationally connected to the gear case, and a drive shaft housing, the drive shaft housing configured to support the drive shaft internally therethrough, whereby the drive shaft and the drive shaft housing are configured to provide 360 degrees of rotation independent of a motor structure supporting the motor.

In still a further exemplary embodiment of the outboard motor and methods of use thereof operating an outboard motor having a motor, and a gear case rotationally connected a propeller shaft, the method comprising the steps of providing a telescopic drive shaft, the telescopic drive shaft having a first drive shaft end rotationally connected to the motor and a second drive shaft end rotationally connected to the gear case, a telescopic drive shaft housing, the telescopic drive shaft housing configured to support the telescopic drive shaft internally therethrough, whereby the telescopic drive shaft and the telescopic drive shaft housing are configured to provide a depth adjustment for the gear case and the propeller shaft, and a multi-speed transmission positioned between the motor and the first drive shaft end, sensing a water speed of less than approximately twenty miles per hour, operating the transmission in a low gear, wherein the propeller shaft rotates a propeller between 0 and approximately 2,000 revolutions per minute, and operating the motor with the propeller shaft and said propeller submerged below a water line via said depth adjustment of the gear case and the propeller shaft.

In still a further exemplary embodiment of the outboard motor and methods of use thereof operating an outboard motor having a motor, and a gear case rotationally connected a propeller shaft, the method comprising the steps of providing a telescopic drive shaft, the telescopic drive shaft having a first drive shaft end rotationally connected to the motor and a second drive shaft end rotationally connected to the gear case, a telescopic drive shaft housing, the telescopic drive shaft housing configured to support the telescopic drive shaft internally therethrough, whereby the telescopic drive shaft and the telescopic drive shaft housing are configured to provide a depth adjustment for the gear case and the propeller shaft, and a multi-speed transmission positioned between the motor and the first drive shaft end, sensing a water speed of greater than approximately twenty miles per hour, operating the transmission in a high gear, wherein the propeller shaft rotates a propeller between approximately 2,000 and 8,000 revolutions per minute, and operating the motor with the propeller shaft and the propeller proximate a waterline via the depth adjustment of the gear case and the propeller shaft.

A feature of the outboard motor and methods of use thereof is the ability to exhaust treated catalyzed exhaust through a catalytic converter, silencer, muffler or any other gas or particulate reducer and/or noise reducer, and thereafter discharge treated exhaust into the atmosphere without polluting the aquatic environment with hot poisonous toxic chemicals and gases and noise pollution causing marine life to depart from their habitat or flee from the boat exhaust noise pollution spread over miles. No noise or exhaust discharge into the water. Thus, helping to eliminating, what science is now proving to be, the disastrous effects of operating noise generating devices in the aquatic environment.

Another feature of the outboard motor and methods of use thereof is the ability to provide a reduced size lower unit, gear box, and/or propeller since the exhaust tubing, piping, or exhaust manifold has been removed from the submerged lower unit or gear case, and thus a smaller or reduced size lower unit will provide a reduced hydrostatic drag coefficient as compared to the larger exhaust configured lower unit.

Still another feature of the outboard motor and methods of use thereof is the ability to provide a midsection and/or lower unit, propeller housing, drive shaft, drive shaft housing and/or gear case and propeller that rotates 360 degrees independent of the powerhead (uncouple the powerhead from the lower unit) rather than the entire outboard motor pivoting relative to the boat transom, by creating independent rotating midsection and/or lower unit from the powerhead, and thus, having 360 degrees to control the direction of thrust or propulsion of the boat or to offer directional control of the craft, and thus, removing motor weight and torque from the steering mechanism.

Yet another feature of the outboard motor and methods of use thereof is the ability to vertically adjust the propeller or propeller shaft height between a low speed fully submerged propeller to fast speed surface-piercing propeller via a telescopic drive shaft housing, the telescopic drive shaft housing configured to support the telescopic drive shaft internally therethrough, whereby the telescopic drive shaft and the telescopic drive shaft housing are configured to provide depth adjustment for the gear case and the propeller shaft to enable the propeller depth to be raised to surface-piercing and lowered to fully submerged during propulsion, and thus to improve propulsion efficiency at both high and low speeds respectively As the name implies this propeller runs at the surface of the water effectively dipping one blade in the water at a time or allowing one blade at a time pierce the waterline, instead of creating a thrusting vortex, or column of water under the surface, the surface piercing propeller literally paddles across the top of the water.

This is a remarkable difference. Observe a duck lifting off from the water, notice his feet, his taking to the air is greatly aided by his surface piercing feet, paddling across the surface of the water. Another example is the rowing scull, with the coxswain calling cadence, a rowing team dips the paddles in the water and pulls, what you will see is the rowing scull moves almost inch for inch to the movement of the rowers paddle. Paddle moves, boat moves, very little slip, very efficient. The surface piercing prop does much the same thing, literally paddling across the surface of the water. By running very close to the water's surface the vortex is eliminated, allowing the next blade to get a fresh "bite" of water. Literally "paddling", but paddling very quickly indeed, such as 250 times per second. The benefits of this, the surface piercing propeller design, are indispensable at high speed; however, at low speed and under heavy load the submerged propeller is far more desirable, due to its ability to generate more thrust from a standstill, and thus integrating both operating modes into a single unit.

Yet another feature of the outboard motor and methods of use thereof is the fuel efficiency achieved utilizing the smaller or reduced size lower unit without the exhaust manifold, and dual efficient operation mode of the high speed surface piercing raised propeller design, and the low speed lowered or submerged propeller thrust under heavy load.

Yet another feature of the outboard motor and methods of use thereof is the application of multiple higher speed forward gears via a multi-speed transmission to enable higher speed revolutions per minute of propeller shaft and propeller coupled with raiseable fast speed surface-piercing propeller to achieve higher boat speeds.

Yet another feature of the outboard motor and methods of use thereof is the ability to eliminate the need for a reverse gear rotating the propeller in an opposite direction. Rather utilizing the 360 rotating lower unit, propeller housing, drive shaft, and/or gear case and propeller to rotate 180 degrees and pull or push the boat in reverse.

Yet another feature of the outboard motor and methods of use thereof is its ability to meet upcoming Environmental Protection Agency's (EPA) Clean Air Act and/or California Air Resources Board marine engine pollution and discharge standards.

Moreover, EPA has published dissolved oxygen (DO) criteria for liquid, such as fresh, salt and brackish water, and wastewater, sewage and industrial wastewater discharges into the same bodies of water to protect organisms and their uses from the adverse effects of low DO conditions. The Agency developed these criteria because hypoxia (low dissolved oxygen) is a significant problem for lakes, streams, rivers, and coastal waters that receive a lot of runoff that contain nutrients (for example, nitrogen and phosphorous and other oxygen-demanding biological wastes). Excessive nutrients in aquatic systems stimulate algae growth, which in turn uses up the oxygen needed to maintain healthy fish, shellfish, and other aquatic life populations.

EPA's Environmental Monitoring and Assessment Program (EMAP) for lakes, streams, rivers, and coastal waters has shown areas exposed to some dissolved oxygen concentrations of less than 5 mg/L. Long periods of DO below 5 mg/L can harm larva life stages for many fish, shellfish, and other aquatic life populations.

Yet another feature of the outboard motor and methods of use thereof is its fast speed surface-piercing propeller that injects or dissolves large amounts of oxygen (DO) into lakes, streams, rivers, and coastal waters and its release of treated exhaust into the atmosphere during operation help to raise dissolved oxygen levels verse underwater release of toxic hot poisonous carbon monoxide and other petroleum by-products spread over miles.

Yet another feature of the outboard motor and methods of use thereof is its works efficiently with the propeller at depth or submerged to propel the heavy load boat or ship up to approximately 20-25 MPH or speed set point(s) with propeller speed of 0-2,000 RPM capable of placing the boat or ship up on a plane.

Yet another feature of the outboard motor and methods of use thereof is its works efficiently with the propeller at surface piercing to propel the heavy load boat or ship up to speeds above approximately 20-25 MPH or speed set point (s) with propeller speed of 2,000-8,000 RPM or higher capable of placing the boat or ship up on a plane.

Yet another feature of the outboard motor and methods of use thereof is there is virtually no limits to the amount of horsepower a single engine can have with the additions of telescopic lower unit, and a low and wide profile.

Yet another feature of the outboard motor and methods of use thereof is a single engine with a dramatically reduced environmental signature and virtually unlimited horsepower will allow tremendous expiation of the outboard motor onto much larger craft.

Yet another feature of the outboard motor and methods of use thereof is its ability to provide a low and wide profile and thus spreads the motor weight and torque across a broader section of the transom promoting overall stability of the boat or ship.

Yet another feature of the outboard motor and methods of use thereof is its ability to provide a small profile "racing style" lower unit to reduce hydrostatic drag promoting fuel efficiency of the outboard motor.

Yet another feature of the outboard motor and methods of use thereof is its ability to add oxygen and/or dissolved oxygen to the water via a surface piercing propeller.

Yet another feature of the outboard motor and methods of use thereof is its ability to provide a new way for a marine motor to interface with the water.

These and other features of the outboard motor and methods of use thereof will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The present outboard motor and methods of use thereof will be better understood by reading the Detailed Description of the Preferred and Selected Alternate Embodiments with reference to the accompanying drawing Figures, in which like reference numerals denote similar structure and refer to like elements throughout, and in which.

DETAILED DESCRIPTION

Figure 1:
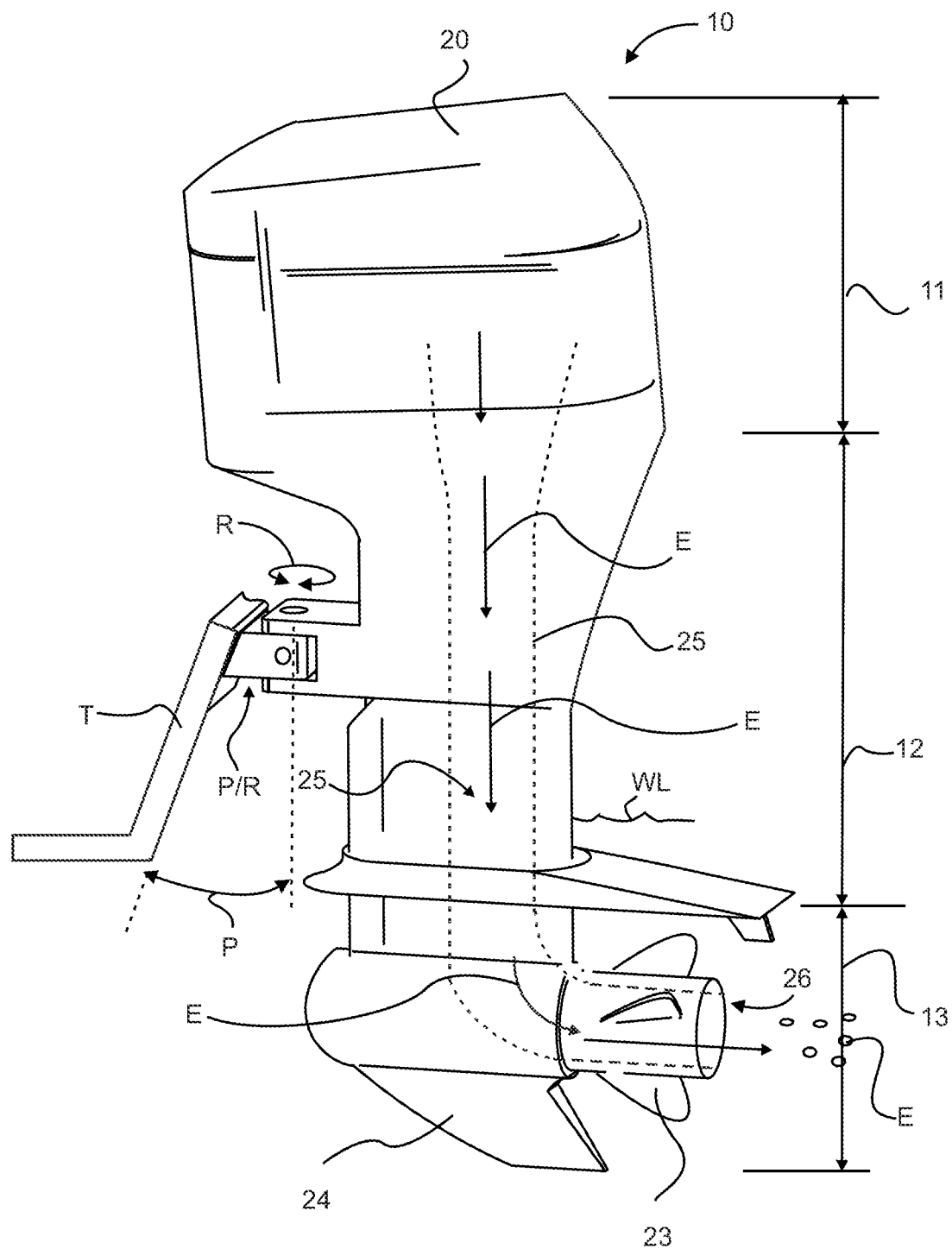
FIG. 1 is a side view of a prior art outboard motor.

Referring now to FIG. 1 there is illustrated a prior art outboard marine motor, such as outboard motor 10. Outboard motor 10 is a self-contained unit that includes an engine or motor, such as powerhead 20, designated vertically as section 11, midsection designated as section 12 containing an exhaust housing 25, and drive shaft, and a large "club foot" lower unit designated as section 13 contains a propeller 23, an exhaust port or exhaust manifold 26, and a skeg 24 to protect the propeller from bottom debris. The powerhead 20, designated vertically as section 11 and/or midsection designated as section 12 together form a single unit that is removeably affixed to the outside of the transom T, which is positioned at the stern of a boat or ship. The powerhead 20, designated vertically as section 11, midsection designated as section 12, and lower unit designated as section 13 together form a single or fixed unit. Outboard motor 10, a single or fixed unit, rotates R (rotation R) about 45 degrees either side of center (shown) of pivot & rotation mechanism P&R relative to transom T to enable steering control of the boat or ship via a turning mechanism, such as steering arm 21, and thus control the direction of thrust or propulsion of the boat. Outboard motor 10, a single or fixed unit, pivots P about 90 degrees about pivot & rotation mechanism P&R relative to transom T to enable lifting or raising of midsection designated as section 12 and lower unit designated as section 13 up relative to water line WL or up and above water line WL. Thus, outboard motor 10, a single or fixed unit, is limited to less than about 45 degrees of rotation R either side of center of rotation mechanism RM.

Furthermore, this single unit of fixed section 11, section 12, and section 13 place all the motor torque and weight on the motor pivot and the steering mechanism, and thus limits the size of powerhead 20. Still furthermore, the single or fixed unit positions propeller 23 in a very limited range of motion, requiring movement of the entire engine assembly to effectively raise or lower the propeller, therefore effectively limiting the propellers' position beneath the water line WL wherein propeller 23 and a portion of the midsection designated as section 12 are inefficiently drug or pushed through the water creating resistance and compression type shock wave in front of the high speed rotating propeller 23.

Motor exhaust E from powerhead 20 travels down exhaust conduit 25 through midsection designated as section 12 and into lower unit designated as section 13 where exhaust E comprising toxic gases, oil, and noise pollution exit through exhaust port or exhaust manifold 26 into the water beneath the water line WL causing large amounts of pollution (especially oil, residue, carbon gasses and noise) to be directly discharged into the water polluting the water and marine life environment and disbursing marine life fleeing the noise.

In describing the exemplary embodiments of the present disclosure, as illustrated in FIGS. 2-10, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Figure 2:
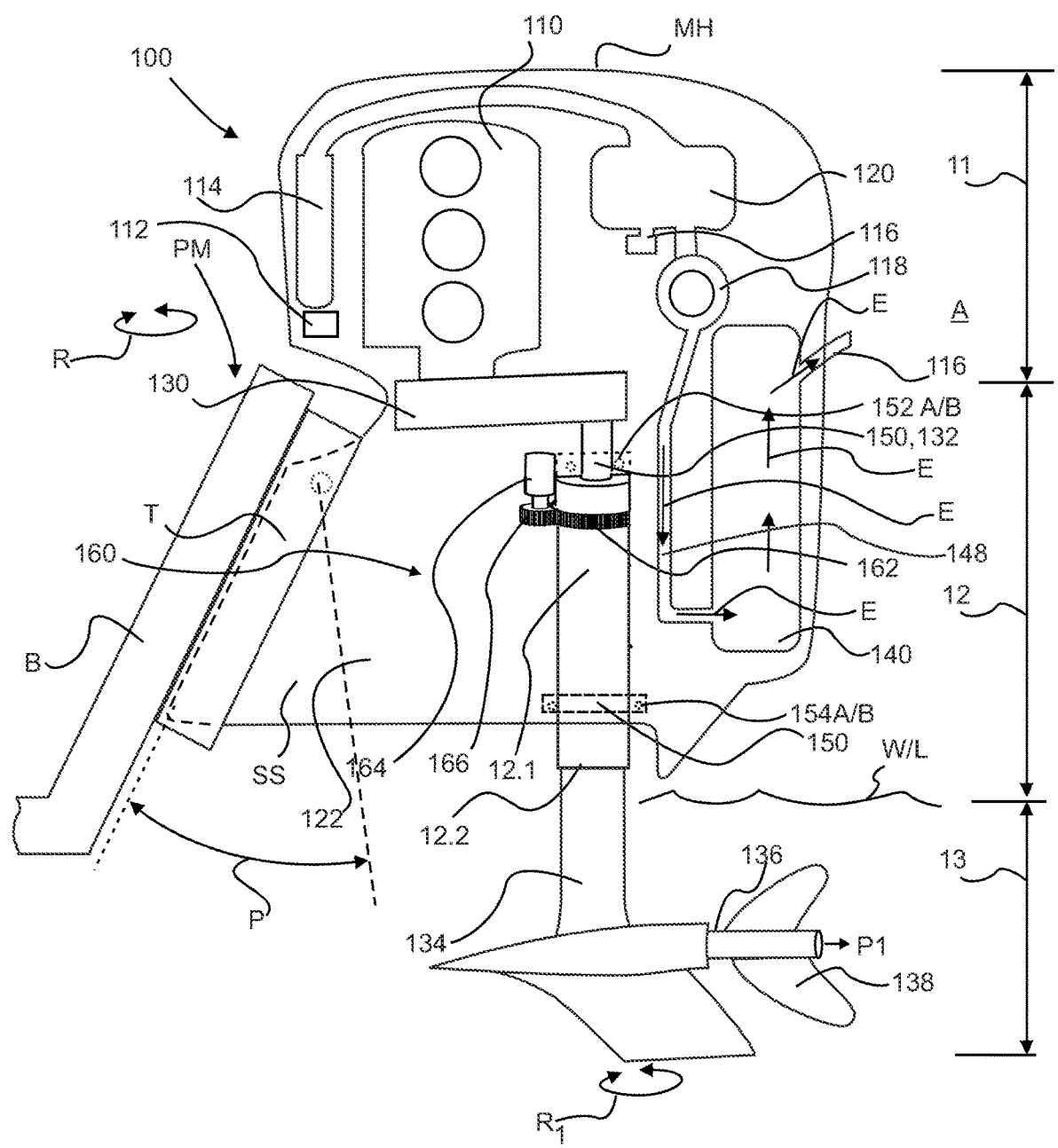
FIG. 2 is a side view of an exemplary embodiment of the outboard motor and methods of use thereof.

Referring now to FIG. 2, by way of example, and not limitation, there is illustrated an example embodiment outboard marine motor, such as outboard motor 100. Outboard motor 100 may be removeably attached to the outside of the transom T, which is positioned at the stern of a boat or ship. It is contemplated herein that outboard motor 100 may pivot P approximately 90 degrees about pivot mechanism PM having motor structure, such as super structure SS relative to transom T to enable tilting or pivoting of midsection designated as section 12 and lower unit designated as section 13 down relative to water line WL or up and above water line WL. It is recognized herein that outboard motor 100 does not rotate R (rotation R) about a rotation mechanism RM relative to transom T such as shown in FIG. 1.

Outboard motor 100 may include standard outboard motor features, systems, and functionality as shown in a block diagram, such as powerhead, engine or motor 110, with subsystems such as, a computer or engine control unit 112, fuel injection system 114, engine exhaust manifold and exhaust plumbing 116, turbocharger or multi turbocharger 118, water to air inter cooler 120, heat exchanger 122 for cooling engine water and inter cooler, forward and reverse transmission 130, with or without drive engaging clutch, drive shaft and/or drive shaft housing 132, gear case and gear case housing 134, propeller shaft 136 and propeller 138.

Moreover, outboard 100 may include catalytic converters, silencer, muffler systems, and the like, exhaust system 140 connected to engine exhaust manifold and exhaust plumbing 116 to convert or capture harmful exhaust compounds discharged from motor 110 into harmless or less harmful compounds prior to above water line WL discharge from tail pipe 124 into the atmosphere A to meet upcoming Environmental Protection Agency's (EPA) Clean Air Act and/or California Air Resources Board marine engine pollution and discharge standards. Discharging catalyzed exhaust into the atmosphere A reduces 1) noise pollution discharged under water line WL resulting in less disbursement of marine and aquatic life due to excess noise pollution travelling through the water medium, and 2) discharge of untreated exhaust containing hazardous gases, compounds and unbearnt or partially burnt petromeum fuels and oils under water line WL, which leads to surface film buildup of petroleum products on water line WL.

Referring again to FIG. 2, by way of example, and not limitation, there is illustrated an example embodiment outboard marine motor, such as outboard motor 100 having 360 degrees of rotation of (or rotate, rotating, or rotational R1)

internal parts to decouple (or enable independent rotation R1) of drive shaft housing, such as midsection designated as section 12 and lower unit designated as section 13 independent or relative to motor 110. Midsection designated as section 12 may include first shaft housing end or upper midsection end 12.1 and second shaft housing end or lower midsection end 12.2. Midsection designated as section 12 may include rotational joint or coupler 150 between transmission 130 or motor 110 and drive shaft 132 and a reduced friction constraining mechanism between moving parts to enable midsection designated as section 12 to rotate up to 360 degrees, such as first housing bearing or upper midsection bearing 152 AB positioned proximate upper midsection end 12.1 and second housing bearing or lower midsection bearing 154A/B positioned proximate lower midsection end 12.2 to constrain and enable drive shaft housing 132, drive shaft, and/or lower unit designated as section 13 to rotate R1 360 degrees relative thereto motor 110, transmission 130, support, engine mount hardware, motor structure, or super structure SS, and/or transom T.

To control rotation of drive shaft housing 132 and/or lower unit designated as section 13, drive shaft housing 132 may include a collar or formed gear, such as ring gear 162 formed, affixed or removeably affixed thereto drive shaft housing 132. Ring gear 162 may be mechanically connected to a drive gear, such as pinion gear 166. Pinion gear 166 may be mechanically turned or rotated in either direction via a compressed air or hydraulic or electrical motor or the like, such as drive motor 164. It is recognized herein that controlled rotation of drive shaft housing 132 and/or lower unit designated as section 13, drive shaft housing 132 may be of any conventional construction.

It is alternatively contemplated herein that ring gear 162 may be a collar affixed or removeably affixed thereto drive shaft housing 132 wherein one or more mechanical arms or members or cables may be rotationally affixed to sides or opposite sides of collar as ring gear 162 or drive shaft housing 132, wherein one or more mechanical members (such as steering rods) configured to move in a linear motion causing ring gear 162 or drive shaft housing 132 to rotate R1 approximately 360 degrees relative thereto motor 110, transmission 130, super structure SS, and/or transom T.

It is further alternatively contemplated herein that belt 162 may be an affixed or removeably affixed thereto drive shaft housing 132 wherein pulley 166 may be rotated by drive motor 164 causing drive shaft housing 132 to rotate R1 approximately 360 degrees relative thereto motor 110, transmission 130, super structure SS, and/or transom T. It is contemplated herein that other rotational or steering means known to one of ordinary skill in the art, which are configured to rotate R1 drive shaft housing 132 and/or lower unit designated as section 13 approximately 360 degrees relative thereto motor 110, transmission 130, super structure SS, and/or transom T are included herein.

In operation of power steering assembly 160, rotation of drive motor 164 rotates pinion gear 166, which rotates ring gear 162, which rotates R1 drive shaft housing 132 and/or lower unit designated as section 13, especially propeller 138. Therefore, rotation of drive motor 164 results in steering rotation of mechanically coupled lower unit designated as section 13, especially change of propeller 138 and propulsion P1 from propeller 138 in any direction thereabout 360 degrees of rotation R1 and such propulsion P1 will push or pull transom T of boat or ship in substantially the opposite direction. It is recognized herein that 180 degrees of rotation R1 of power steering assembly 160 provides propulsion P1 from propeller 138 in a direct toward transom T and such propulsion P1 will push or pull transom T of boat or ship in substantially a reverse Re direction (position opposite of forward F as shown in FIG. 2), thus eliminating the need to provide a reverse rotation (reverse gear) therein transmission 130.

It is recognized herein that drive shaft housing 132 and/or lower unit designated as section 13 may rotate R approximately 360 degrees relative to midsection designated as section 12 and/or relative thereto motor 110, super structure SS, and transom T to enable 360 of propulsion P1 from lower unit designated as section 13 and more specifically to steer outboard motor 100 in any of 360 degrees of direction.

It is further recognized herein that transmission 130 may include an engaging/disengaging clutch, a multi-ratio, multispeed transmission configured with two or more forward gears and may be a reverse gear enabling motor 110 of outboard motor 100 to rotate propeller 138 (via a drive shaft and gear box) at higher speeds of rotation or revolutions per minute (RPM) than a single forward gear transmission. Moreover, higher speeds of rotation of propeller 138 and removal of exhaust housing 25 from lower unit designated as section 13 enables a thin small design and reduced hydrostatic drag coefficient design of low lower unit designated as section 13, shown in FIG. 2 as compared to the larger exhaust configured lower unit of FIG. 1.

Figure 3:
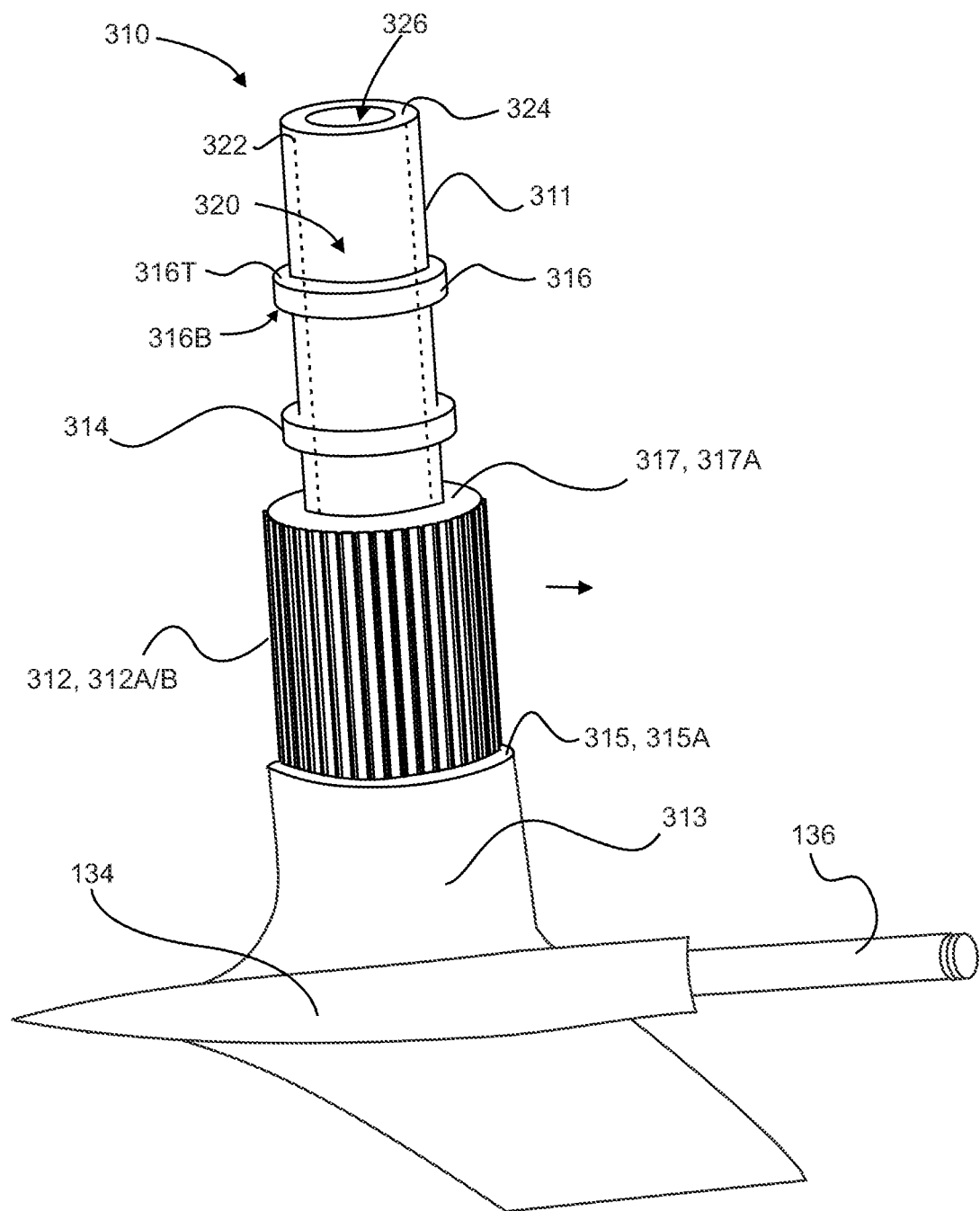
FIG. 3 is a side view of an exemplary embodiment of a drive shaft housing lower unit, according to FIG. 2.
Figure 4:
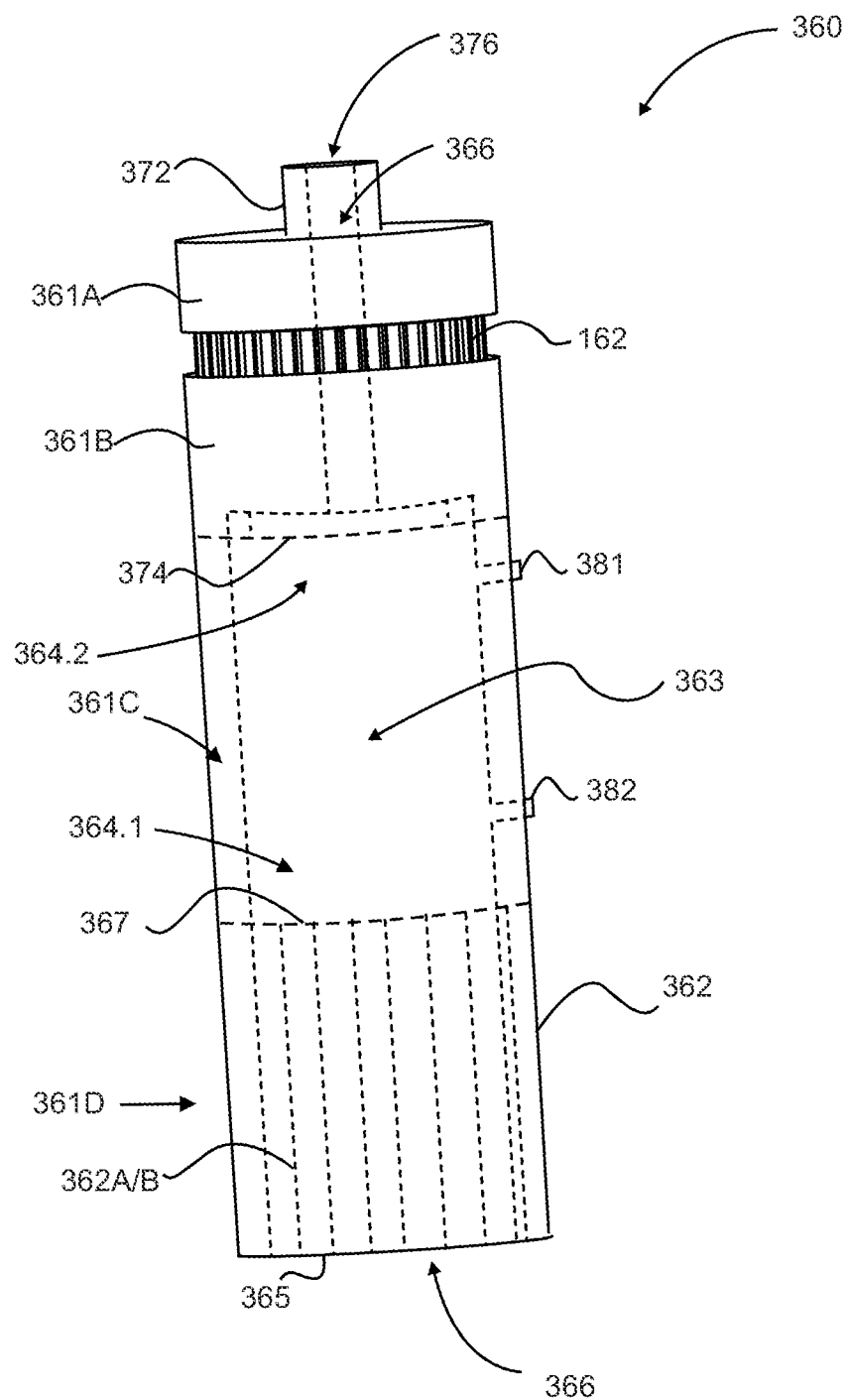
FIG. 4 is a side view of an exemplary embodiment of a drive shaft housing upper unit, according to FIG. 2.

Referring now to FIG. 3, 4, 5, by way of example, and not limitation, there is illustrated an example embodiment of reciprocating midsection designated as section 12 and/or lower unit designated as section 13, such as telescoping drive shaft 330, telescopic drive shaft housing 300, gear case housing 134, and propeller 138 to enable vertical adjustment of raising and lowering propeller 138 during the operation of outboard motor 100 relative to water line WL. Telescoping drive shaft 330 and telescopic drive shaft housing 300 includes telescopic lower housing 310 and upper housing 360 with telescoping drive shaft 330 positioned internally therethrough.

Referring again to FIG. 3, lower housing 310 of telescopic drive shaft housing 300, may include gear case and gear case housing 134 (hydrodynamic efficient designed), propeller shaft 136, propeller 138. Moreover, gear case housing 134 may include first lower extension member 311, second lower extension member 312, and third lower extension member 313 each integral to and extending therefrom gear case housing 134, one on top of the other.

First lower extension member 311 may integrally extend therefrom gear case housing 134. It is contemplated herein that first lower extension member 311 may be narrower in diameter or cross section than gear case housing 134. First lower extension member 311 may include lower housing male splines 312A (to mate, match or interlace or controlled linear slide with upper housing 360 female splines 362A or vice-versa, first mateable spline or any like linear slideable non-rotational device) formed thereon outer surface 312B of first lower extension member 311. It is contemplated herein that male splines 312A may be narrower in diameter or cross section than gear case housing 134. First lower extension member 311 may include second lower extension member 312 integral to and extending therefrom first lower extension member 311. First lower extension member 311 may include a transition surface such as first ledge 317 therebetween first lower extension member 311 and second lower extension member 312. It is further contemplated herein that second lower extension member 312 may be narrower in diameter or cross section than first lower extension member 311. Second lower extension member 312 may include control piston 316 affixed thereto second lower extension member 312, and bulkhead 314 affixed thereto upper housing 360 and slidably affixed thereto second lower extension member 312 forming bottom portion 364.1 and top portion 364.2 of hydraulic chamber 364 therein upper housing 360.

Third lower extension member 313 may integrally connect gear case housing 134 thereto first lower extension member 311. Third lower extension member 313 may include a transition surface such as second ledge 315 therebetween third lower extension member 313 and first lower extension member 311.

Second lower extension member 312 may include internal hollow interior or tube, such as lower housing conduit 320 forming a passageway therethrough first lower extension member 311, second lower extension member 312, and third lower extension member 313 to provide access therethrough to gear case housing 134. Lower housing conduit 320 may include lower housing end cap 324, wherein a reduced friction constraining mechanism between moving parts, such as lower housing bearing 332 to enable telescopic drive shaft 330 to rotate up to 360 degrees therein first lower extension member 311, second lower extension member 312, and third lower extension member 313, wherein telescopic drive shaft 330 extends therethrough lower housing aperture 326 connected thereto lower housing conduit 320 and having a reduced radius or size relative to second lower extension member 312.

Referring again to FIG. 4, upper housing 360 of telescopic drive shaft housing 300, may include telescoping drive shaft housing 361 having first upper housing section 361A, second upper housing section 361B, third upper housing section 361C, and fourth upper housing section 361D. First upper housing section 361A, second upper housing section 361B, third upper housing section 361C, and fourth upper housing section 361D may include tube, hollow interior, or passageway, such as upper housing interior tube 366, therethrough forming a passageway therethrough upper housing 360. First upper housing conduit 362 may be configured to accommodate and control therein extension and retraction of second lower extension member 312 having male splines 312A. Moreover, first upper housing conduit 362 may include lower housing having second or female splines 362A (to mate/mateable with second lower extension member 312 first or male splines 312A or vice-versa) (to mate, match or interlace or controlled linear slide with second lower extension member 312, first or male splines 312A or vice-versa, second mateable spline or any like linear slideable non-rotational device) formed thereon outer surface 362B of first upper housing conduit 362 to accommodate and control therein extension and retraction of second lower extension member 312. It is contemplated herein that second female splines 362A may be narrower in diameter or cross section than third upper housing section 361C. Furthermore, second upper housing conduit 363 may be configured to accommodate and control therein extension and retraction of third lower extension member 313. Still furthermore, second upper housing conduit 363 may include two or more access ports thereto the interior thereof second upper housing conduit 363, such as first access port 381 and second access port 382 to accommodate insertion (flow in) or release (flow out) of compressed fluid or gas to work as a hydraulic cylinder enabling second lower extension member 312 to have controlled linear travel therein first upper housing conduit 362 and wherein integrally linked third lower extension member 313 to have controlled linear travel therein second upper housing conduit 363. Upper housing 360 may further include as ring gear 162 positioned proximate first upper housing section 361A, second upper housing section 361B or therebetween. Upper housing 360 may further include first upper extension member 372 extending therefrom upper housing end cap 364 positioned proximate first upper housing section 361A. First upper extension member 372 may include upper housing aperture 376 connected thereto upper housing interior tube 366 and having a reduced radius or size relative to first upper extension member 372 to accommodate controlled linear travel therein of telescoping drive shaft 330.

It is further contemplated herein that controlled linear travel of first or male splines 312A of second lower extension member 312 of lower housing 310 to slide therein second or female splines 362A of first upper housing conduit 362 of upper housing 360 has a collapsing or drawn in or raised propeller limit when lower end 365 of upper housing 360 contacts first ledge 315 of lower housing 310 or control piston 316 affixed thereto third lower extension member 313 contacts upper end 374 or the like of second upper housing conduit 363, and an extended, drawn out or lowered propeller limit when control piston 316 affixed thereto first linear member 318 contacts bulkhead 314 or lower end 367 or the like of second upper housing conduit 363.

It is further contemplated herein that lower housing 310 and upper housing 360 may be interchangeable regarding which slides within the other and which has male or female linear slideable means.

Referring again to FIG. 5, telescoping drive shaft 330 of telescopic drive shaft housing 300 may include female shaft or first shaft section 333 and male or second shaft section 343. First shaft section 333 may include hollow interior, such as first shaft interior tube 336 formed therein and forming a passageway therethrough first shaft section 333 from proximate first female shaft end 331 to second female shaft end 332. Second shaft section 343 may include first male shaft end 341 and second male shaft end 342. Moreover, first female shaft end 331 may include first female shaft aperture 334 connected thereto first shaft interior tube 336 to accommodate controlled linear travel therein of second shaft section 343.

Similar thereto first upper housing conduit 362 having second female splines 362A configured to accommodate and control therein extension and retraction of second lower extension member 312 having first male splines 312A; first shaft interior tube 336 of first shaft section 333 may include shaft tube having fourth or female splines 336A (to mate, match, or interlace or controlled linear slide with second shaft section 343 having third or male splines 341A or vice-versa or any like linear slideable non-rotational device, [similar to lower housing first male splines 312A (to mate/mateable or interlace or controlled linear slide with upper housing 360 second or female splines 362A)] formed thereon outer surface 344 of second shaft section 343 to accommodate and control therein extension and retraction of second shaft section 343 from first shaft section 333. It is contemplated herein that second shaft section 343 may be narrower in diameter or cross section than first shaft section 333. It is further contemplated herein that male splines 312A may be narrower in diameter or cross section than third upper housing section 361C.

To enable free rotating telescoping drive shaft 330, telescoping drive shaft 330 may include one or more reduced friction constraining mechanism between moving parts, such as first lower housing bearing 352 rotationally affixed proximate second female shaft end 332 of first shaft section 333 and affixed thereto lower housing 310 and second lower housing bearing 322 rotationally affixed proximate first female shaft end 331 of first shaft section 333 and affixed thereto lower housing 310 to enable telescopic drive shaft 330 to rotate up to 360 degrees therein lower housing 310. Moreover, telescoping drive shaft 330 may include first upper housing bearing 354 rotationally affixed proximate first female shaft aperture 334 of first shaft section 333 and affixed thereto upper housing 360 and second upper housing bearing 356 rotationally affixed proximate second male shaft end 342 of second shaft section 343 and affixed thereto upper housing 360 proximate first upper extension member 372 or first upper housing section 361A to enable telescopic drive shaft 330 to rotate up to 360 degrees therein upper housing 360.

It is still further contemplated herein that second shaft section 343 may linearly extend and retract (telescope) therein first shaft section 333 while freely rotating as telescoping drive shaft 330 within and encompassed by second lower extension member 312 of lower housing 310 linearly extending and retracting (telescope) therein first upper housing conduit 362 of upper housing 360.

It is still further contemplated herein that telescoping drive shaft 330 within and encompassed by second lower extension member 312 of lower housing 310 linearly extending and retracting may include upper limit switch 317A and lower limit 315A switch to provide position feedback to engine control unit 112.

It is recognized herein that second male shaft end 342 of second shaft section 343 may be affixed or mechanically connected to transmission 130 or motor 110 and the other end, first female shaft end 331 of first shaft section 333 may be affixed or mechanically connected to gear case housing 134, which is mechanically connected propeller shaft 136, propeller 138 and configured to rotate 360 degrees and raise and lower relative to water line WL, as telescoping drive shaft 330.

It is recognized herein that telescoping drive shaft 330 and telescopic drive shaft housing 300 may provide a telescopic depth adjustment (to raise and lower relative to waterline WL) of gear case housing 134, which is mechanically connected propeller shaft 136, and propeller 138. Moreover, telescoping drive shaft 330 and telescopic drive shaft housing 300 may be of any conventional construction, as for example it may be constructed from sections which are telescopically and rotatable connected and/or extendible and contractible, such as square tubing or other mateable linkage or the like.

Figure 5:
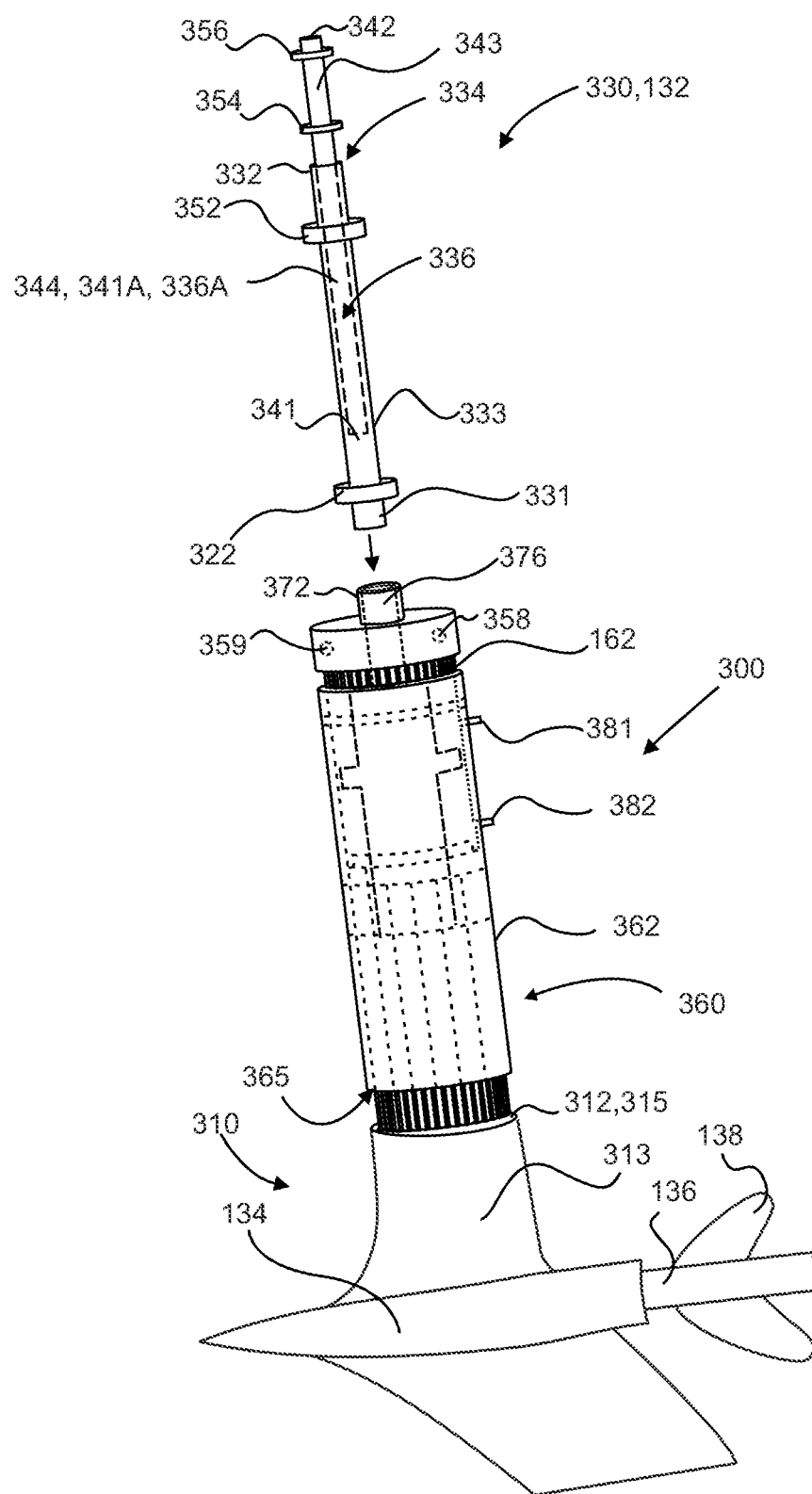
FIG. 5 is a side view of an exemplary embodiment of a telescoping drive shaft and telescoping drive shaft housing lower and upper unit, according to FIG. 2.
Figure 6:
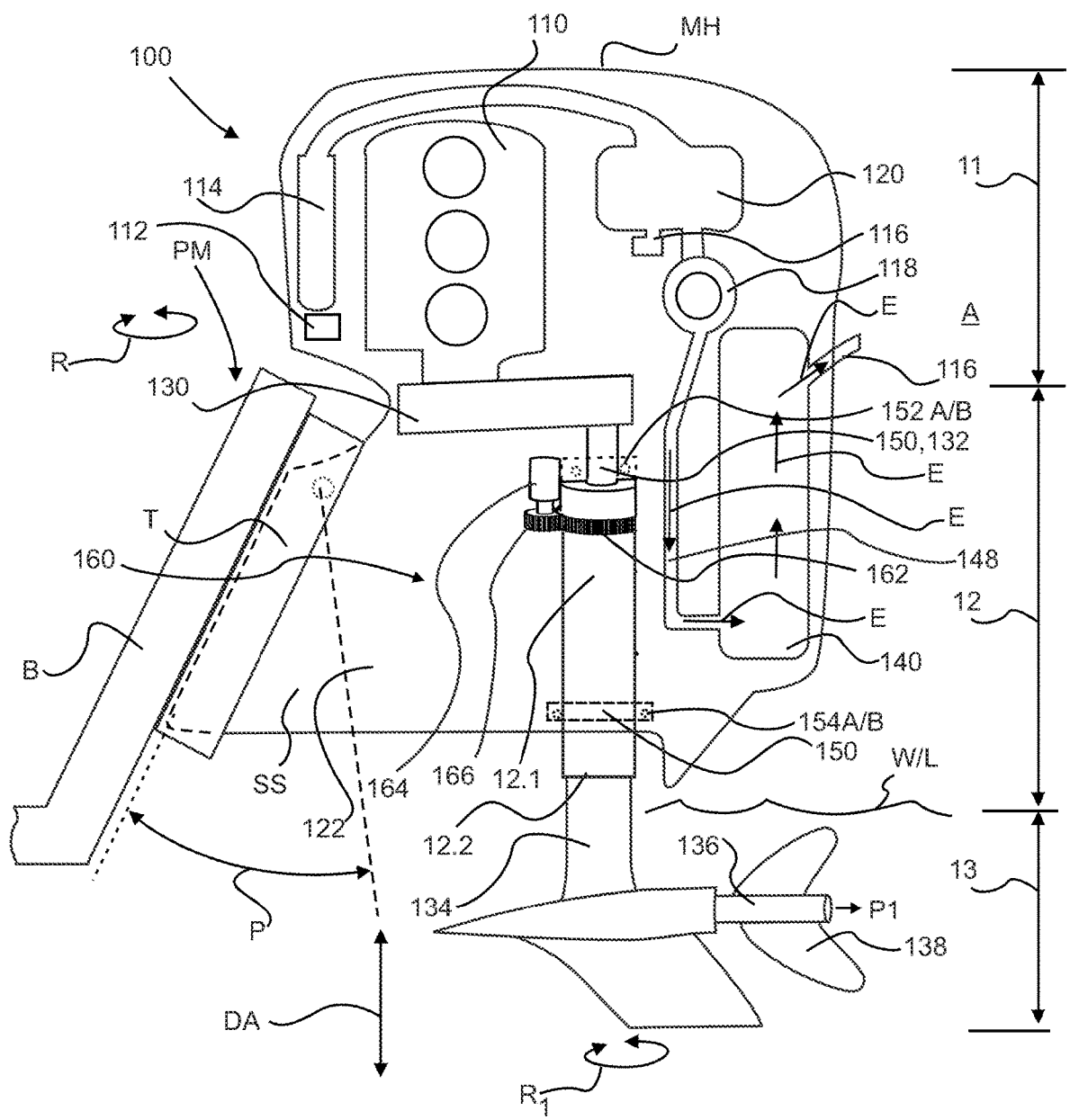
FIG. 6 is a side view of an exemplary embodiment of an outboard motor with telescoping drive shaft and drive shaft housing lower unit and propeller shown extended submerged water line, according to FIG. 2.

Referring now to FIGS. 2, 5 and 6 by way of example, and not limitation, there is illustrated an example embodiment low speed outboard marine motor, such as outboard motor 100 wherein for example pressurized hydraulic fluid HF enters first hydraulic fluid port 381 connected thereto hydraulic chamber 364 and exits second hydraulic fluid port 382 connected thereto hydraulic chamber 364. Such flow of pressurized hydraulic fluid produces a pressurized force thereon top side 316T of control piston 316 affixed thereto third lower extension member 313 and pushes control piston 316 and third lower extension member 313 and integrally connected gear case housing 134 and propeller 138 to a position submerged below water line WL, for slow speed (troll) maneuverability to push or pull transom T of boat or ship. It is contemplated herein that lower unit designated as section 13, gear case housing 134 and propeller 138, may be adjusted downward below waterline WL to any number of increments of fine adjustment to maximize low speed thrust and/or plaining of the boat. In low speed operation, lower unit designated as section 13 is extended or lowered to a position submerged below water line WL, multispeed transmission 130 may be operated in low gear, surface piercing style propeller 138 to work efficiently (provide adequate torque) at depth to propel the heavy load boat or ship up to approximately 20-25 MPH or speed set point (or predetermined speed(s) programmed or preset in engine control unit 112, boat speed set point) with propeller shaft 136 rotational speed of 0-2,000 RPM capable of placing the boat or ship up on a plane. Moreover, lower housing 310 ability to rotate up to 360 degrees enables surface piercing style propeller 138 to provide steering control of the boat or ship.

It is contemplated herein that telescoping drive shaft 330 and telescopic drive shaft housing 300 includes telescopic lower housing 310 and upper housing 360 with telescoping drive shaft 330 positioned internally therethrough may include lowered limit wherein bottom side 316B of control piston 316 contacts bulkhead 314 of said lower housing 310 or second upper housing conduit 363 upper housing 360.

Figure 7:
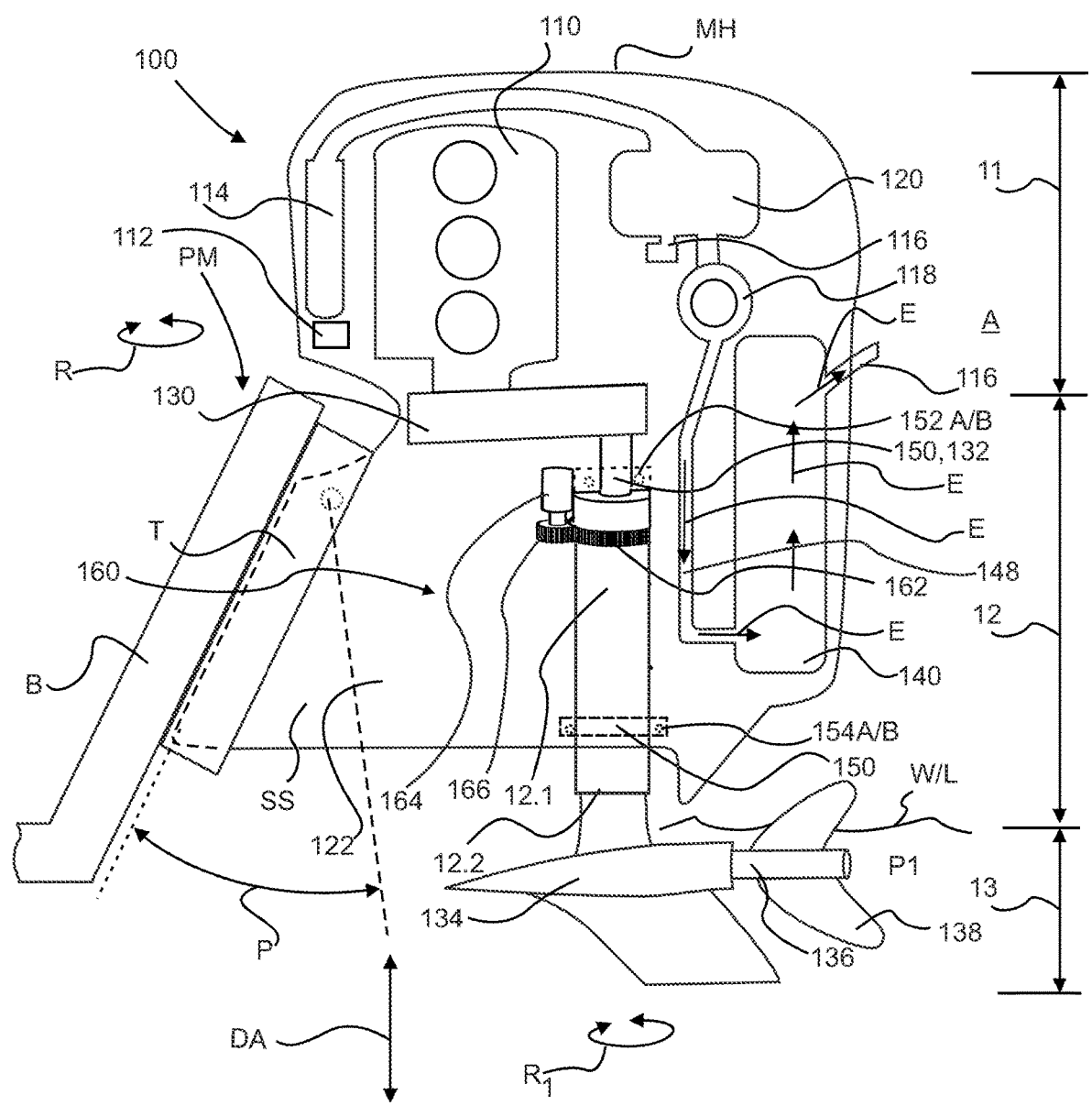
FIG. 7 is a side view of an exemplary embodiment of an outboard motor with telescoping drive shaft and drive shaft housing lower unit and propeller shown retracted to where propeller is surface piercing the water line, according to FIG. 2.

Referring now to FIGS. 2, 5, and 7 by way of example, and not limitation, there is illustrated an example embodiment outboard marine motor, such as outboard motor 100 wherein for example pressurized hydraulic fluid HF enters second hydraulic fluid port 382 connected thereto hydraulic chamber 364 and exits first hydraulic fluid port 381 connected thereto hydraulic chamber 364. Such flow of pressurized hydraulic fluid produces a pressurized force thereon bottom side 316B of control piston 316 affixed thereto third lower extension member 313 and pushes control piston 316 and third lower extension member 313 and integrally connected gear case housing 134 and propeller 138 to a position where propeller shaft 136 is positioned proximate water line WL, for high speed maneuverability by pushing or pulling transom T of boat or ship. It is contemplated herein that lower unit designated as section 13, gear case housing 134 and propeller 138, may be adjusted upward toward or partially above waterline WL to any number of increments of fine adjustment to maximize high speed thrust and/or plaining of the boat B. In high speed operation, lower unit designated as section 13 is retracted or raised to a position where propeller shaft 136 may be positioned proximate water line WL, multispeed transmission 130 may be operated in high gear, surface piercing style propeller 138 to work efficiently (provide adequate torque), wherein surface piercing (propeller 138 actually breaks the surface, water line WL) to propel the heavy load boat or ship up to speeds above 30 MPH or speed set point(s) (or predetermined speed(s) programmed or preset in engine control unit 112, boat speed set point) or initiating propeller 138 depth adjustment DA to surface piercing propeller position as shown in FIG. 7 and with higher propeller shaft 136 rotational speed of 2,000-8,000 RPM and wherein outboard motor 100 may be capable of efficiently propelling the boat or ship at higher speeds. Moreover, by retracting lower unit designated as section 13 several inches, such as, gear case housing 134 and propeller 138, this reduces hydrostatic drag coefficient of pulling lower unit designated as section 13 through the water (less of it to pull through the water).

It is contemplated herein that telescoping drive shaft 330 and telescopic drive shaft housing 300 includes telescopic lower housing 310 and upper housing 360 with telescoping drive shaft 330 positioned internally therethrough may include raised limit wherein a first ledge 315 of said lower housing 310 contacts lower end 365 of upper housing 360.

Figure 8:
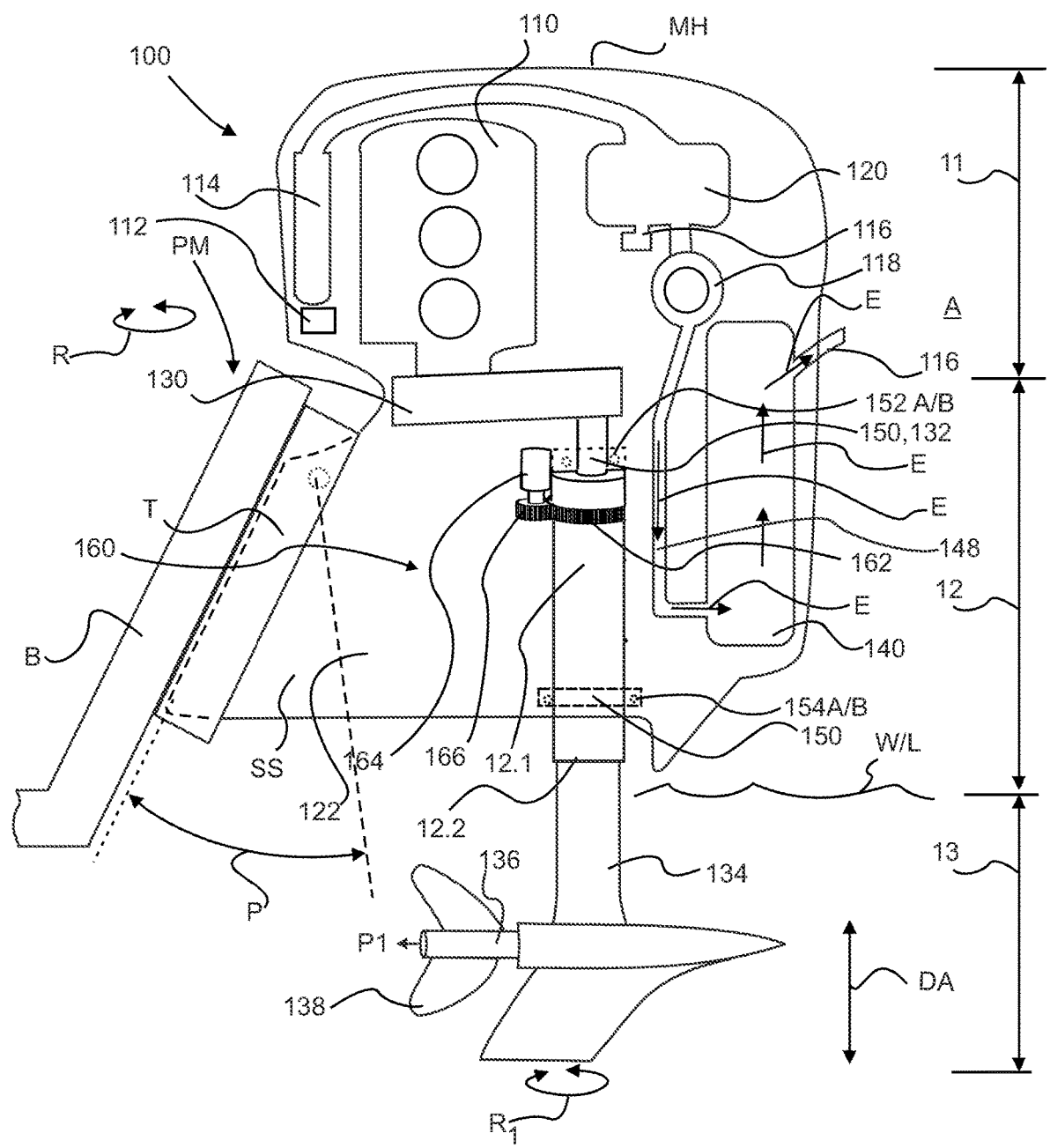
FIG. 8 is a side view of an exemplary embodiment of an outboard motor with telescoping drive shaft and drive shaft housing lower unit, 360 degree rotating drive shaft housing and lower unit, and propeller turned 180 degrees to propel the boat in reverse, according to FIG. 2.

Referring now to FIGS. 2 and 8 by way of example, and not limitation, there is illustrated an example embodiment low speed outboard marine motor, such as outboard motor 100 wherein power steering assembly 160, rotation of drive motor 164 rotates pinion gear 166, which rotates ring gear 162, which rotates R1 drive shaft housing 132 and/or lower unit designated as section 13, especially propeller 138. Moreover, rotation of drive motor 164 results in steering rotation of mechanically coupled lower unit designated as section 13, especially change of propeller 138 and propulsion P1 from propeller 138 in any direction thereabout 360 degrees of rotation R1 and such propulsion P1 will push or pull transom T of boat or ship in substantially the opposite direction (a reverse direction). It is recognized herein that 180 degrees of rotation R1 of power steering assembly 160 provides propulsion P1 from propeller 138 in a direct toward transom T and such propulsion P1 will push or pull transom T of boat or ship in substantially a reverse Re direction (position opposite of forward F as shown in FIG. 2), thus eliminating the need to provide a reverse rotation (reverse gear) therein transmission 130.

Figure 9:
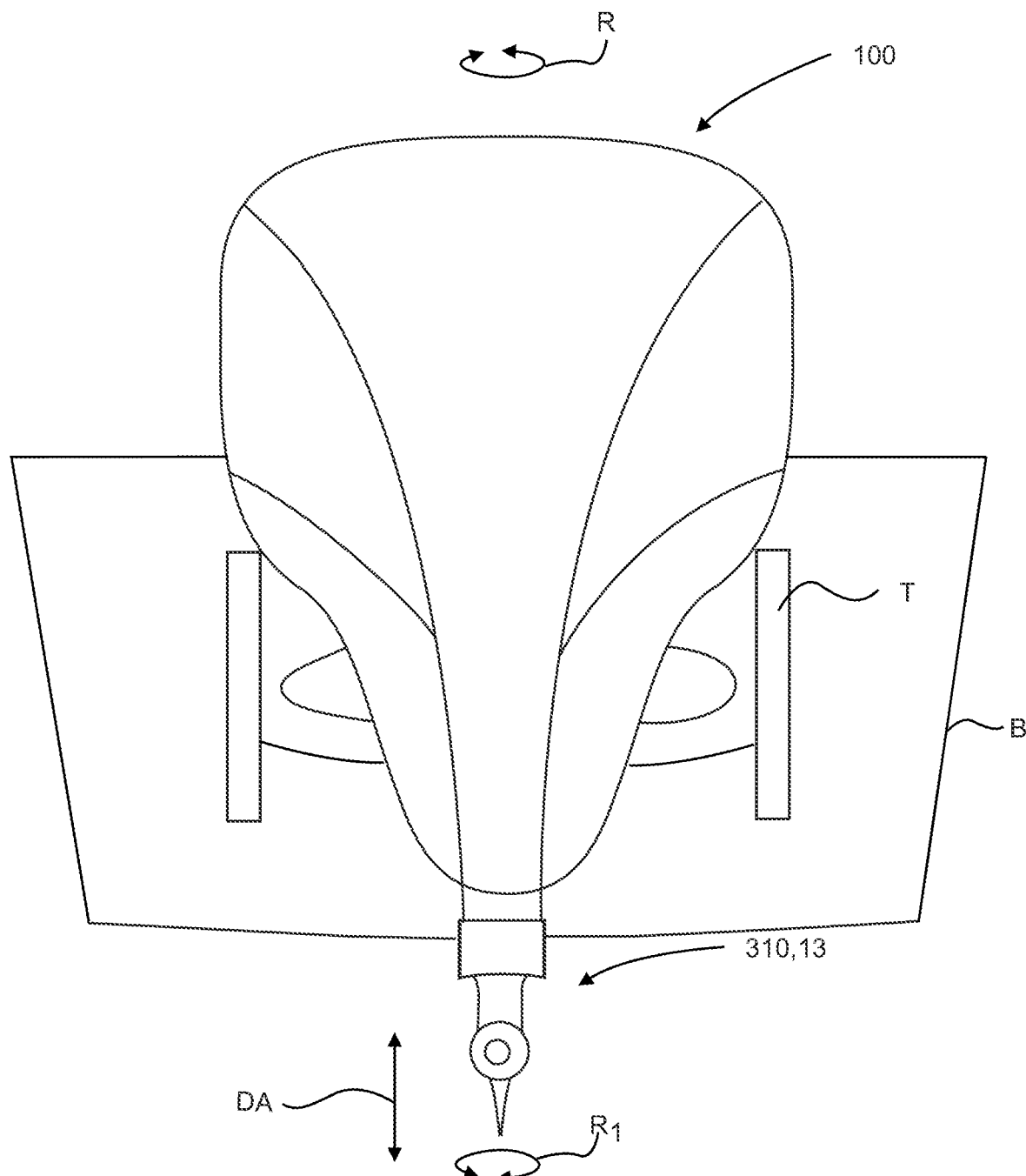
FIG. 9 is a rear view of an exemplary embodiment of an outboard motor with telescoping drive shaft and drive shaft housing lower unit, 360 degree rotating drive shaft housing and lower unit, and racing style lower unit, according to FIG. 2.

Referring now to FIG. 9 by way of example, and not limitation, there is illustrated an example embodiment outboard marine motor, such as outboard motor 100 configured with a low and wide profile motor 110 promoting overall stability of the boat or ship. Furthermore, the wide outboard motor 100 profile spreads the motor weight and torque across a broader section of the transom T promoting overall stability of the boat or ship. Still furthermore a small profile "racing style" lower housing 310 or lower unit designated as section 13 reduces hydrostatic drag promoting fuel efficiency of outboard motor 100.

Figure 10:
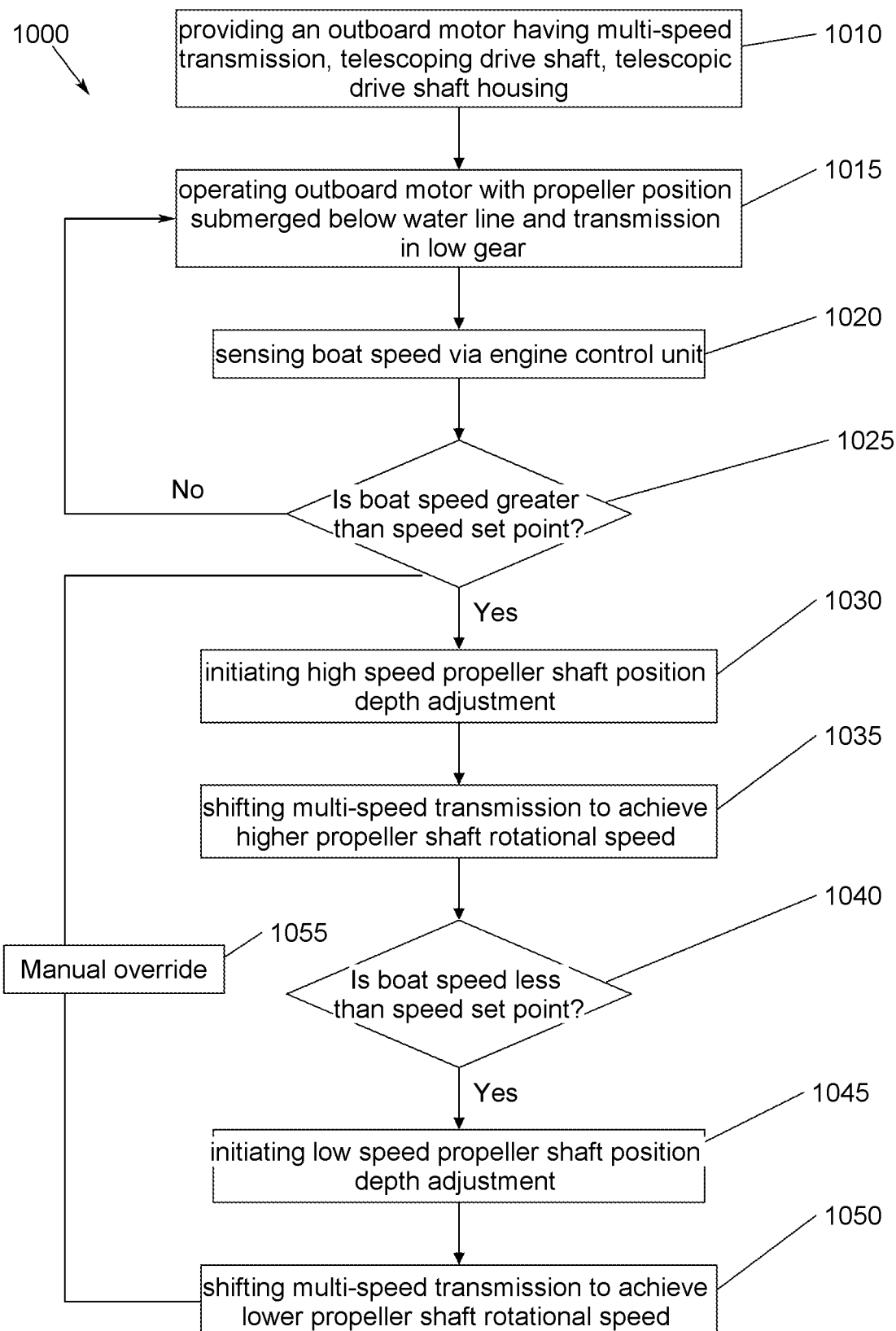
FIG. 10 is a flow diagram of a method of controlled depth adjustment of a propeller shaft based on boat speed.

Referring now to FIG. 10 there is illustrated a flow diagram 1000 of a method of use of an outboard motor 100 having multi-speed transmission and depth adjustable midsection designated as section 12 and/or lower unit designated as section 13 via for efficient operation at low (trolling), medium, and high speed. In block or step 1010, providing an outboard motor 100 having multi-speed transmission 130, telescoping drive shaft 330, telescopic drive shaft housing 300, gear case housing 134, and propeller 138 configured to provide depth adjustment DA of propeller 138 and/or midsection designated as section 12 and/or lower unit designated as section 13. In block or step 1015, operating outboard motor 100 with propeller 138 position submerged below water line WL, multispeed transmission 130 is operated in low gear, surface piercing style propeller 138 to work efficiently (provide adequate torque) at depth to propel the heavy load boat or ship up to approximately 20-25 MPH or speed set point(s) (or predetermined speed(s) programmed or preset in engine control unit 112, boat speed set point) with propeller shaft 136 rotational speed of 0-2,000 RPM capable of placing the boat or ship up on a plane. In block or step 1020, sensing outboard motor 100 via engine control unit 112. In block or step 1025, determining whether operating outboard motor 100 speed is greater than approximately 20 MPH or speed set point(s) (or predetermined speed(s) programmed or preset in engine control unit 112, boat speed set point). In block or step 1030, initiating high speed propeller shaft 136 position depth adjustment DA to proximate water line WL or surface piercing propeller position as shown in FIG. 7, if outboard motor 100 speed is greater than approximately 20 MPH or speed set point(s) (or predetermined speed(s) programmed or preset in engine control unit 112, boat speed set point). In block or step 1035, shifting multi-speed transmission 130 to achieve higher propeller shaft 136 rotational speed of 2,000-8000 RPM or above. In block or step 1040, determining whether operating outboard motor 100 speed is less than approximately 20 MPH or speed set point(s) (or predetermined speed(s) programmed or preset in engine control unit 112, boat speed set point). In block or step 1045, initiating low speed propeller shaft 136 position depth adjustment DA to submerged propeller position as shown in FIG. 2, if outboard motor 100 speed is less than approximately 20 MPH or speed set point(s) (or predetermined speed(s) programmed or preset in engine control unit 112, boat speed set point). In block or step 1050, shifting multi-speed transmission 130 to low gear achieve lower propeller shaft 136 rotational speed of 0-2,000 RPM. Return to step 1025. In block or step 1055, selecting to operate in manual override 1055. Manual override 1055 may include operating outboard motor 100 in trolling or shallow water mode including shifting multi-speed transmission 130 to low gear achieve lower propeller shaft 136 rotational speed of 0-2,000 RPM, initiating high speed propeller shaft 136 position depth adjustment DA to proximate water line WL or surface piercing propeller position as shown in FIG. 7.

The foregoing description and drawings comprise illustrative embodiments of the present disclosure. Having thus described exemplary embodiments, it should be noted by those ordinarily skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments of the disclosure will come to mind to one ordinarily skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein but is limited only by the following claims.

What is claimed is:

1. An outboard motor for attachment to a transom of a craft, said outboard motor comprising:
    a stationary powerhead affixed to the transom of the craft;
    a drive shaft housing configured to support a rotatable drive shaft internally therethrough, said drive shaft housing having a midsection affixed to said stationary powerhead and a gear case housing;
    at least one housing bearing to support said rotatable drive shaft in said midsection and said gear case housing; and
    a steering mechanism configured to provide independent rotation of said gear case housing and a propeller shaft relative to said stationary powerhead to facilitate directional control of the craft.

2. The outboard motor of claim 1, wherein said steering mechanism is configured to provide at least 30 degrees of rotation of said gear case housing and said propeller shaft independent of said stationary powerhead.

3. The outboard motor of claim 1, wherein said steering mechanism is configured to provide at least 180 degrees of rotation of said gear case housing and said propeller shaft independent of said stationary powerhead.

4. The outboard motor of claim 1, further comprising a multi-speed transmission positioned between said powerhead and said rotatable drive shaft.

5. The outboard motor of claim 1, further comprising an exhaust system connected to said powerhead, said exhaust system configured to discharge above a waterline independent of said drive shaft housing.

6. The outboard motor of claim 5, wherein said exhaust system reduces a hydrostatic drag coefficient of said gear case housing via a reduced size of said gear case housing.

7. The outboard motor of claim 1, wherein said steering mechanism further comprising a gear affixed to said gear case housing and a drive motor affixed to said midsection, said drive motor having a pinion gear mechanically coupled to said gear.

8. The outboard motor of claim 1, wherein said steering mechanism further comprising one or more mechanical members.

9. The outboard motor of claim 1, wherein said steering mechanism further comprising a belt positioned around said gear case housing and a drive motor affixed to said midsection, said drive motor rotates said belt.

10. The outboard motor of claim 1, wherein said at least one housing bearing further comprising a first housing bearing to rotationally support said midsection and a second housing bearing to rotationally support said gear case housing.

11. A method of steering a boat, said method comprising the steps of:
providing a stationary powerhead affixed the boat, a drive shaft housing configured to support a rotatable drive shaft internally therethrough, said drive shaft housing having a midsection affixed to said stationary powerhead and a gear case housing, a set of housing bearings to support said rotatable drive shaft in said midsection and said gear case housing, a steering mechanism configured to provide independent rotation of said gear case housing and a propeller shaft relative to said stationary powerhead; and
rotating said steering mechanism in a first direction rotates said gear case housing and said propeller shaft in said first direction independent of said stationary powerhead to facilitate navigational control of the boat.

12. The method of claim 11, rotating said steering mechanism at least 30 degrees rotates said gear case housing and said propeller shaft in said 30 degrees independent of said powerhead.

13. The method of claim 11, rotating said steering mechanism at least 180 degrees rotates said gear case housing and said propeller shaft in said 180 degrees independent of said powerhead.

14. The method of claim 11, further comprising the step of discharging an exhaust above a waterline independent of said drive shaft housing via an exhaust system connected to said powerhead.

15. The method of claim 11, further comprising the step of increasing a rotational speed of said propeller shaft via a multi-speed transmission positioned between said powerhead and said drive shaft.

16. The method of claim 14, further comprising the step of reducing a hydrostatic drag coefficient of said gear case housing via a reduced size of said gear case housing.

17. The outboard motor of claim 1, wherein said steering mechanism is positioned between said midsection and said gear case housing.

18. The outboard motor of claim 1, wherein said steering mechanism is power assisted.

19. The outboard motor of claim 11, wherein said steering mechanism is positioned between said midsection and said gear case housing.

20. The outboard motor of claim 11, wherein said steering mechanism is power assisted.

* * * * *